United States Patent
Liao et al.

(10) Patent No.: US 7,382,314 B2
(45) Date of Patent: Jun. 3, 2008

(54) HANDHELD GPS DEVICE

(75) Inventors: Kuo-Chu Liao, Taipei (TW);
Ching-Chung Tang, Taipei (TW);
Che-Ying Su, Taipei (TW)

(73) Assignee: Asustek Computer Inc., Peitou, Taipei (TW)

( * ) Notice: Subject to any disclaimer, the term of this patent is extended or adjusted under 35 U.S.C. 154(b) by 0 days.

(21) Appl. No.: 11/643,665

(22) Filed: Dec. 22, 2006

(65) Prior Publication Data
US 2007/0247364 A1 Oct. 25, 2007

(30) Foreign Application Priority Data
Mar. 24, 2006 (TW) ................ 95110390 A

(51) Int. Cl.
G01S 5/14 (2006.01)
H01Q 3/12 (2006.01)
H04B 1/06 (2006.01)
(52) U.S. Cl. .............. 342/357.15; 342/374; 455/277.1
(58) Field of Classification Search .......... 342/357.15, 342/357.06, 374; 455/277.1
See application file for complete search history.

(56) References Cited
U.S. PATENT DOCUMENTS

2002/0044085 A1* 4/2002 Howell et al. ......... 342/357.06
2003/0085837 A1* 5/2003 Abraham ............... 342/357.15
2003/0100285 A1 5/2003 Puglia
2003/0107514 A1* 6/2003 Syrjarinne et al. ..... 342/357.06

FOREIGN PATENT DOCUMENTS

| JP | 2005017260 A | * | 1/2005 |
| TW | 480342 B | | 3/2002 |
| TW | 262853 Y | | 4/2005 |

OTHER PUBLICATIONS

English Translation of JP 2005017260 A.*

* cited by examiner

Primary Examiner—Thomas H. Tarcza
Assistant Examiner—Fred H. Mull
(74) Attorney, Agent, or Firm—Muncy, Geissler, Olds & Lowe, PLLC

(57) ABSTRACT

A handheld GPS device has a device body. A base band processor is installed in the device body. Three antennas with high directivity are respectively installed perpendicular to three surfaces of the device body for receiving GPS signals. A control device is coupled to the base band processor and the antennas with high directivity. At least two switches are respectively coupled to the control device and each of the three switches corresponds to one of the three antennas with high directivity. One of the switches enables the control device to permit the base band processor receiving GPS signal from the corresponding antenna with high directivity when the frame triggers one of the switches.

10 Claims, 4 Drawing Sheets

HANDHELD GPS DEVICE

RELATED APPLICATIONS

The present application is based on, and claims priority from, Taiwan Application Serial Number 95110390, filed on Mar. 24, 2006, the disclosure of which is hereby incorporated by reference herein in its entirety.

BACKGROUND

1. Field of Invention

The present invention relates to a handheld GPS (Global Positioning System) device. More particularly, the present invention relates to a handheld GPS device with multiple antennas.

2. Description of Related Art

The availability of accurate electronic maps has made handheld GPS devices very popular. GPS devices receive satellite signals through high-directivity antennas pointed to the sky. Conventional handheld GPS devices use adjustable antennas that can be pointed in different directions to obtain satellite signals. Thus, handheld GPS devices can be held in any way so long as its antenna is adjusted to point to the sky.

However, a conventional adjustable antenna with high directivity is usually very big compared to the body of the GPS device. A comparatively large antenna is disadvantageous for both the industrial design and manufacturing of handheld GPS devices, and for integrating a GPS system into a handheld computer.

SUMMARY

It is therefore an objective of the present invention to provide a handheld GPS device with multiple antennas so as to make an industry design of the handheld GPS device easier and still get GPS signals of good quality.

In accordance with the foregoing and other objectives of the present invention, the embodiment of a handheld GPS device includes a base band processor, a plurality of antennas and at least one switch. The antennas with high directivity are respectively installed perpendicular to three surfaces of the device body to receive GPS signals. A control device is coupled to the base band processor and the high directivity antennas. The switch is respectively coupled to the control device. When the switch is triggered the control device permit the base band processor receiving GPS signal from the corresponding high-directivity antenna.

Thus, the handheld GPS device may organize its antennas on different surfaces and make one of antennas to get a better GPS signals. Antennas of smaller size can be selected and buried in different surfaces of the device body such that an industry design of a handheld GPS device or integrating a GPS system into a handheld computer is easier.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
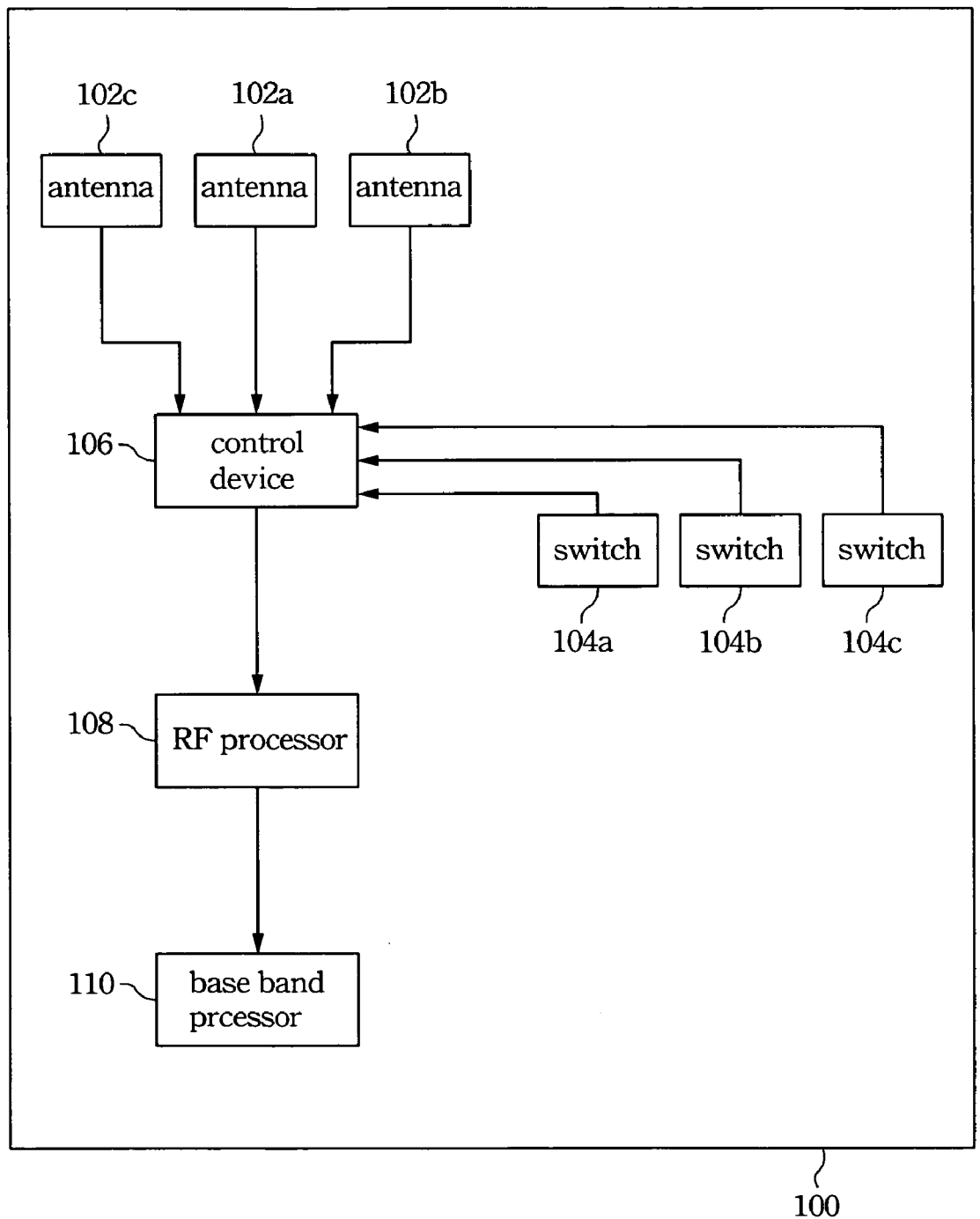
FIG. 1 is a block diagram of a GPS device according to one preferred embodiment of this invention.

As stated above, the present invention provides an embodiment of a handheld GPS (Global Positioning System) device with multiple antennas. Multiple antennas are installed on different surfaces of the GPS device such that at least one antenna can point to the sky no matter how the GPS device is being held. The GPS device also has switches and a control device to permit the base band processor receiving GPS signal from the antenna in a best position.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is the block diagram for a GPS device block diagram according to one preferred embodiment of this invention. A handheld GPS device 100 has three antennas 102a/102b/102c with high directivity for receiving GPS signals. The three antennas 102a/102b/102c are coupled with a control device 106. Three switches 104a/104b/104c are also coupled the control device 106. The three switches 104a/104b/104c respectively correspond to the three antennas 102a/102b/102c such that the control device 106 can permit the base band processor receiving GPS signal from an antenna according to a corresponding switch. For instance, when the switch 104a is triggered, the control device 106 receives signals from the switch 104a and only permits the base band processor receiving GPS signal from the antenna 102a. Three switches 104a/104b/104c can be electronic switches or mechanical switches. Similarly, when the switch 104b or 104c is triggered, the control device 106 only permits the base band processor receiving GPS signal from the antenna 102b or 102c.

The block diagram of the GPS device also includes a RF (Radio Frequency) processor 108 and a base band processor 110. The RF processor 108 is coupled to the control device 106 so as to receive GPS signals from three antennas 102a/102b/102c. The base band processor 110 is coupled to the RF processor 108 so as to get processed (by the RF processor 108) GPS signals for further application, i.e. locating a point on an electronic map.

Figure 2:
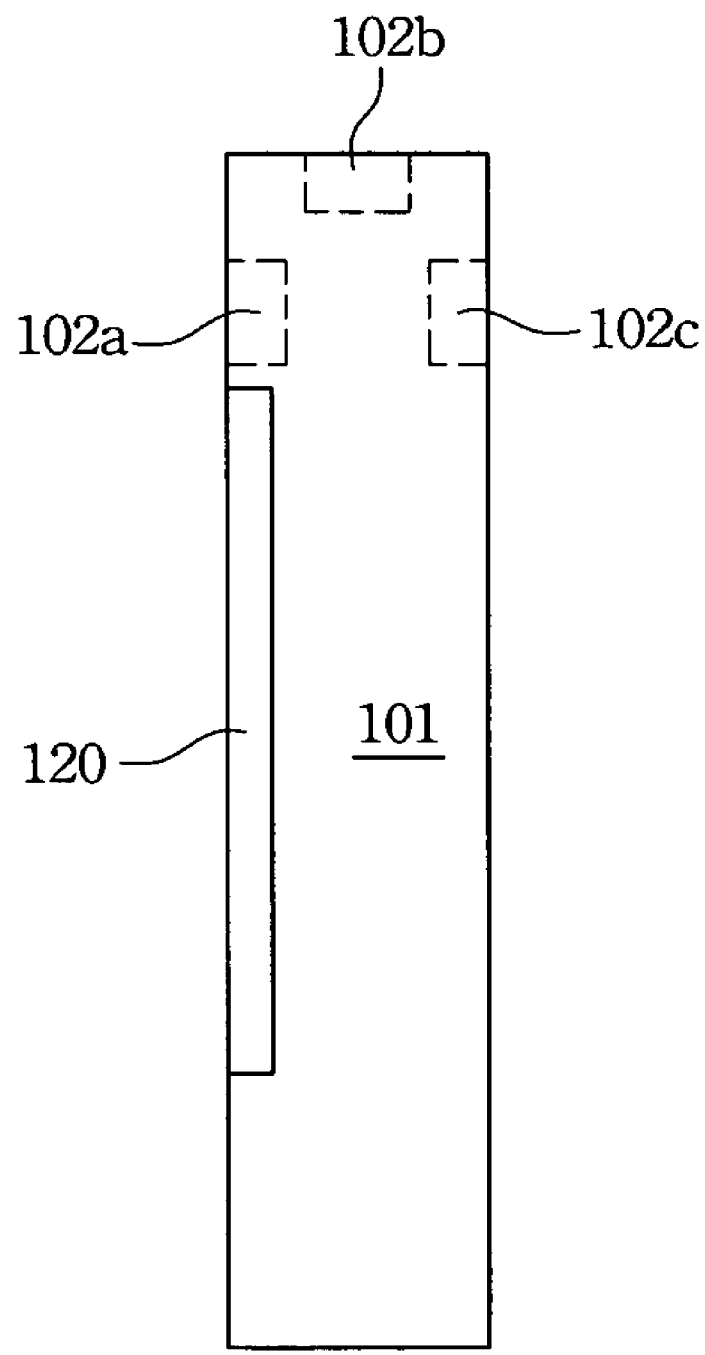
FIG. 2 illustrates a side view of a GPS device according to one preferred embodiment of this invention.

FIG. 2 illustrates a side view of a GPS device according to one preferred embodiment of this invention. Three high directivity antennas 102a/102b/102c are installed perpendicular to three surfaces of the device body 101 to receive GPS signals. Specifically, three antennas 102a/102b/102c are installed with the directivity perpendicular to three surfaces of the device body 101. As far as fastening ways in a car are concerned, positions of three antennas 102a/102b/102c can satisfy most demands.

Figure 3A:
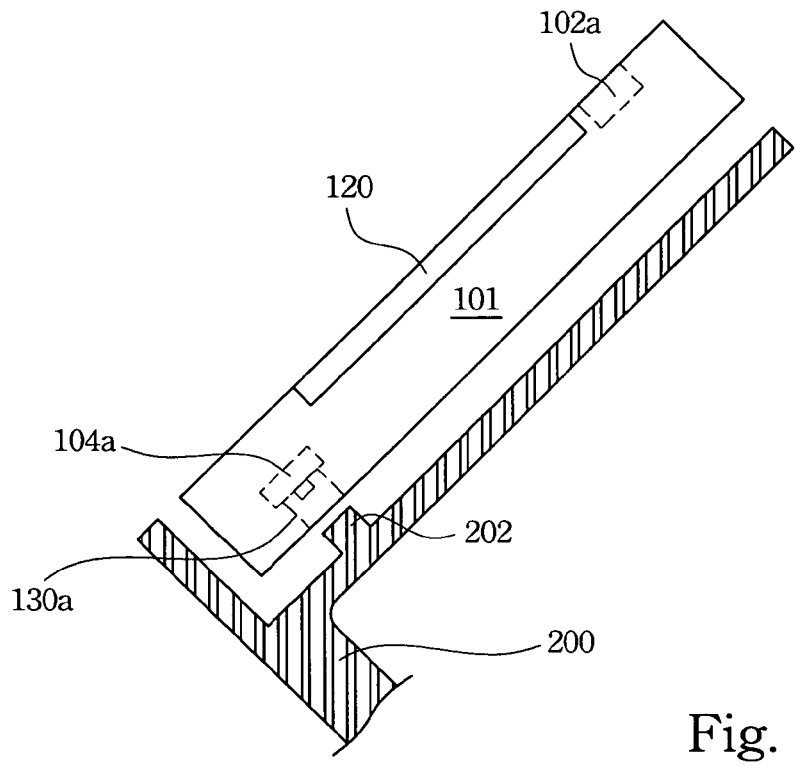
FIGS. 3A, 3B and 3C respectively illustrate three different fastening ways in a car according to one preferred embodiment of this invention.
Figure 3B:
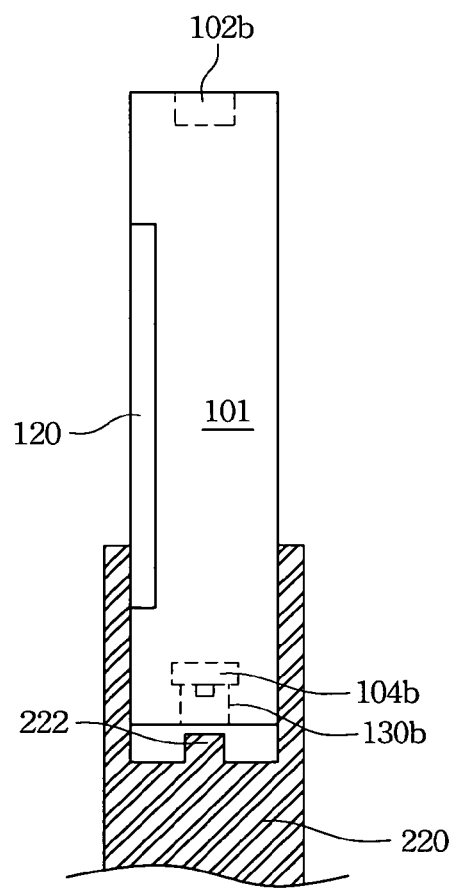
Figure 3C:
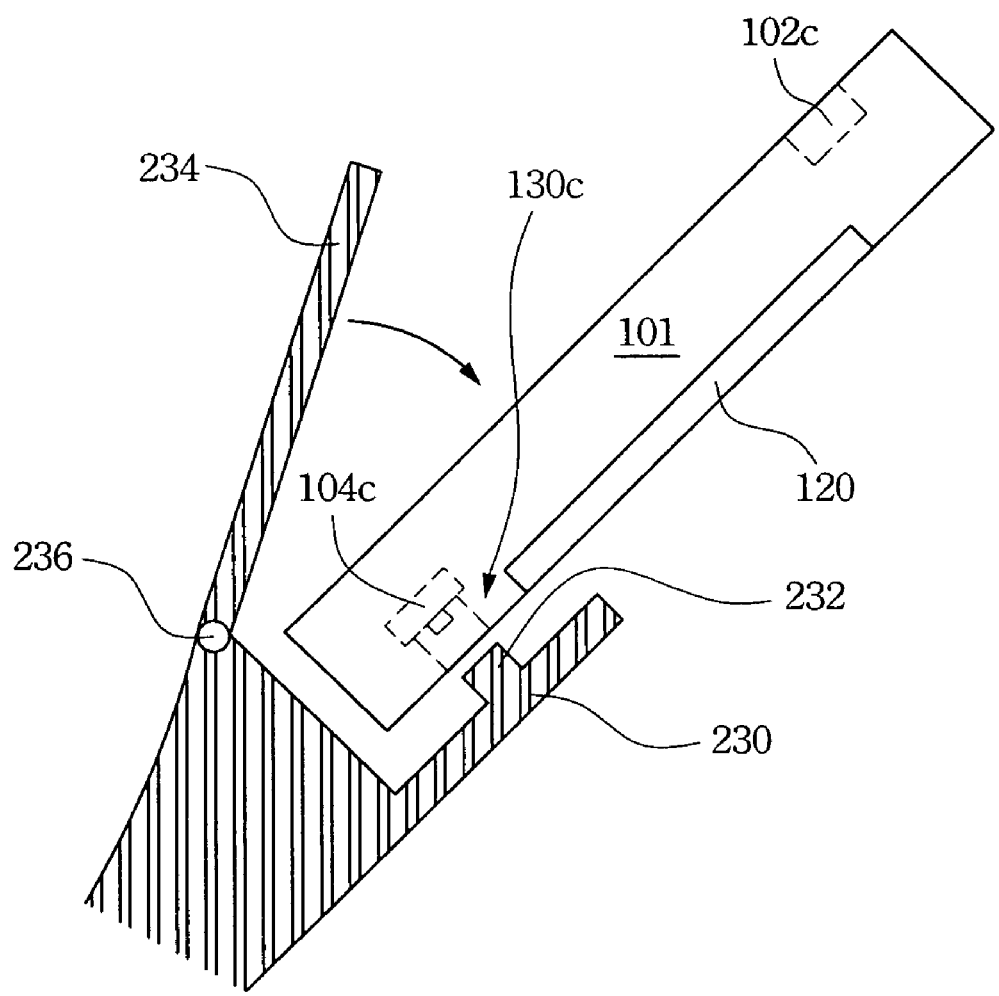

FIGS. 3A, 3B and 3C respectively illustrate three different ways the antennas can be fastened in a car according to one preferred embodiment of this invention. FIG. 3A illustrates a frame 200 suitable for fastening a GPS device in a front seat of the car. When the device body 101 is put on the frame 200, a trigger pin 202 will trigger a mechanical switch 104a via a through hole 130a such that GPS signals received by the antenna 102a can be processed by a base band processor for further application. This fastening method organizes the antenna 102a and a flat display device 120 on the same surface of the device body 101 such that a driver can conveniently look at the flat display device 120 and the antenna 102a can receive better GPS signals.

FIG. 3B illustrates a vertical frame 220 for fastening a GPS device. When the device body 101 is put on the frame 220, a trigger pin 222 will trigger a mechanical switch 104b via a through hole 130b such that GPS signals received by the antenna 102b can be processed by a base band processor for further application. This fastening method organizes the antenna 102b on a top surface of the device body 101, such that the antenna 102b can receive better GPS signals.

FIG. 3C illustrates a frame 230 suitable for fastening a GPS device close to a windshield of the car. When the device body 101 is put on the frame 230, a trigger pin 232 will trigger a mechanical switch 104c via a through hole 130c such that GPS signals received by the antenna 102c can be processed by a base band processor for further application. The frame 230 also includes a fastening plate 234 to secure the device body 101. This fastening method organizes the antenna 102a and the flat display 120 on two opposite surfaces of the device body 101 such that a driver can conveniently look at the flat display 120 and the antenna 102c can receive better GPS signals.

According to preferred embodiments, the handheld GPS device of present invention organizes its three antennas on three different surfaces and selects one of three antennas to get better GPS signals. Smaller antennas can be selected and buried in different surfaces of the device body such that an industrial design of a handheld GPS device or integrating a GPS system into a handheld computer is easier.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A handheld GPS device, comprising:
   a base band processor;
   a plurality of antennas with high directivity for receiving GPS signals;
   a control device, coupled to the base band processor and the antennas with high directivity; and
   at least two switches, coupled to the control device, wherein one of the switches enables the control device to permit the base band processor receiving GPS signal from one of the antennas with high directivity when a frame triggers one of the switches.

2. The handheld GPS device of claim 1, wherein the switches are electronic switches.

3. The handheld GPS device of claim 1, wherein the switches are mechanical switches.

4. The handheld GPS device of claim 1, further comprising a radio frequency processor respectively coupled to the base band processor and the control device.

5. A handheld GPS device, comprising:
   a device body, having three holes;
   a base band processor, installed in the device body;
   three antennas with high directivity, respectively installed perpendicular to three surfaces of the device body for receiving GPS signals;
   a control device, coupled to the base band processor and the antennas with high directivity; and
   three switches, respectively disposed within three holes of the device body and respectively coupled to the control device and each of three switches correspond to one of three antennas with high directivity, wherein one of the switches being triggered via the corresponding hole enables the control device to permit the base band processor receiving GPS signal from the corresponding antenna with high directivity.

6. The handheld GPS device of claim 5, wherein the three switches are mechanical switches.

7. The handheld GPS device of claim 5, wherein the three holes are located on the three surfaces of the device body.

8. The handheld GPS device of claim 5, wherein the three switches are electronic switches.

9. The handheld GPS device of claim 5, further comprising a radio frequency processor respectively coupled to the base band processor and the control device.

10. The handheld GPS device of claim 5, further comprising a frame for supporting the handheld GPS device, wherein one of the three switches being triggered enables the control device to permit the base band processor receiving GPS signal from the corresponding antenna with high directivity when the handheld GPS device is put on the frame.

* * * * *